(12) United States Patent
Wei et al.

(10) Patent No.: US 9,535,540 B2
(45) Date of Patent: Jan. 3, 2017

(54) TOUCHING OBJECT AND OPTICAL TOUCHING ASSEMBLY USING THE SAME

(71) Applicant: Wistron Corporation, New Taipei (TW)

(72) Inventors: Shou-Te Wei, New Taipei (TW); Shang-Chin Su, New Taipei (TW); Hsun-Hao Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 75 days.

(21) Appl. No.: 14/149,818

(22) Filed: Jan. 8, 2014

(65) Prior Publication Data

US 2015/0077396 A1    Mar. 19, 2015

(30) Foreign Application Priority Data

Sep. 18, 2013 (TW) ............................. 102133942 A

(51) Int. Cl.
*G06F 3/042* (2006.01)
*G06F 3/0354* (2013.01)
(Continued)

(52) U.S. Cl.
CPC ......... *G06F 3/0428* (2013.01); *G06F 3/03542* (2013.01); *G06F 3/03545* (2013.01);
(Continued)

(58) Field of Classification Search
CPC .... G06F 3/03545; G06F 3/0317; G06F 3/042; G06F 3/03542; G06F 3/0386; G06F 3/0325; G06F 3/0416; G06F 3/0428; G06F 19/3437; G06F 1/32; G06F 2203/04104; G06F 3/0304; G06F 3/033; G06F 3/044; G06F 3/046; G06F 2203/04807; G06F 3/0421; G06F 3/0482; G06F 3/04842; G06F 3/0354; G09G 2300/026; G09G 3/342; G09G 3/3426

See application file for complete search history.

(56) References Cited

U.S. PATENT DOCUMENTS

| | | | |
|---|---|---|---|
| 2005/0041013 A1* | 2/2005 | Tanaka | G06F 3/0428 345/156 |
| 2007/0188478 A1* | 8/2007 | Silverstein et al. | 345/179 |

(Continued)

FOREIGN PATENT DOCUMENTS

TW    201032105    9/2010

OTHER PUBLICATIONS

"Office Action of Taiwan Counterpart Application," issued on Mar. 9, 2015, with English translation thereof, p. 1-p. 9.

*Primary Examiner* — Md Saiful A Siddiqui
(74) *Attorney, Agent, or Firm* — Jianq Chyun IP Office

(57) ABSTRACT

An optical touching assembly, including a display device, a sensing device, and a touching object, is provided. The display device has a touching area. The sensing device is electrically connected to the display device. The touching object is adapted to enter the touching area, such that the sensing device senses the motion of the touching object to control the display device. The touching object has an optical controlling element that generates light along with the motion of the touching object. The sensing device senses a characteristic variation of the light to trigger at least one operating function of the display device.

19 Claims, 5 Drawing Sheets

(51) Int. Cl.
*G06F 3/0482* (2013.01)
*G06F 3/0484* (2013.01)

(52) U.S. Cl.
CPC .......... *G06F 3/0421* (2013.01); *G06F 3/0482* (2013.01); *G06F 3/04842* (2013.01); *G06F 2203/04807* (2013.01)

(56) References Cited

U.S. PATENT DOCUMENTS

| | | | |
|---|---|---|---|
| 2008/0165162 A1* | 7/2008 | Zloter et al. | 345/179 |
| 2010/0206645 A1* | 8/2010 | Harel | 178/19.02 |
| 2010/0207910 A1 | 8/2010 | Liu et al. | |
| 2011/0043492 A1* | 2/2011 | Elsasser | G06F 3/0428 |
| | | | 345/179 |
| 2011/0157101 A1* | 6/2011 | Chang | 345/179 |
| 2011/0279248 A1* | 11/2011 | Ogawa | 340/13.25 |
| 2013/0321351 A1* | 12/2013 | Paul et al. | 345/179 |
| 2014/0176460 A1* | 6/2014 | Chen | 345/173 |

* cited by examiner

TOUCHING OBJECT AND OPTICAL
TOUCHING ASSEMBLY USING THE SAME

CROSS-REFERENCE TO RELATED
APPLICATION

This application claims the priority benefit of Taiwan application serial no. 102133942, filed on Sep. 18, 2013. The entirety of the above-mentioned Patent application is hereby incorporated by reference herein and made a part of this specification.

BACKGROUND OF THE INVENTION

Field of the Invention

The invention relates to a touching object and particularly relates to an optical touching assembly using the touching object.

Description of Related Art

Following the development of technology and the trend of the market, more and more electronic devices or display screens are provided with touching function. However, restricted by production costs and touching effects, currently capacitive or resistive touch screens are suitable only for small-sized devices, such as mobile phones. As photosensitive elements develop, most large-sized touch screens use optical touch screens, which have advantages, such as low production costs and favorable touching accuracy, and are therefore competitive in the market of large-sized touch screens. As a principle, the touching function of optical touch screens is realized by detecting the position of a finger and converting this position to a screen position.

As the sizes of capacitive, resistive, or optical touch screens increase, from time to time the user needs to move a touching object across the large screen in order to perform specific touching operations, such as selection or switching. For example, when the user draws a graph with the touching object at the lower left corner of the screen, the menu for switching graph colors or lines may be at the upper right corner of the screen. In such a case, the user is required to move the touching object to the upper right corner for selection and then move back to the lower left corner for drawing. The user may need to move back and forth on the screen many times in order to complete the drawing, which is very inconvenient for the user. On the other hand, the menu of the operation interface becomes smaller when the touch screen is small, and it may cause the user to mistakenly select wrong items.

Considering the above, it is necessary to provide a touching operation assembly for improving efficiency, convenience, and accuracy, and solving the problems that exist in the current technology.

SUMMARY OF THE INVENTION

The invention provides a touching object and an optical touching assembly using the same, which trigger at least one operating function of a display device by sensing a variation of light generated by the touching object.

An optical touching assembly of the invention includes a display device, a sensing device, and a touching object. The display device has a touching area. The sensing device is electrically connected to the display device. The touching object is adapted to enter the touching area, such that the sensing device senses the motion of the touching object to control the display device. The touching object has an optical controlling element that generates a plurality of first lights along with a variation of the motion of the touching object. The sensing device senses a characteristic variation of the first lights to trigger an operating function of the display device.

A touching object of the invention includes a main body and a plurality of optical controlling elements. The main body has a center axis. The optical controlling elements are disposed on the main body and arranged around the center axis. An optical characteristic of the optical controlling elements varies along with the optical controlling elements arranged around the center axis.

In one embodiment of the invention, the optical controlling elements include a plurality of light sources that have different luminances.

In one embodiment of the invention, the optical controlling elements include a plurality of light sources that have different wavelengths.

In one embodiment of the invention, the touching object includes a light source that generates a plurality of second lights. The first lights are generated from the second lights via the optical controlling elements.

In one embodiment of the invention, the optical controlling elements are a plurality of optical elements that have different transmittances.

In one embodiment of the invention, the optical controlling elements are a plurality of optical elements that have different transmittance wavelengths.

In one embodiment of the invention, the optical touching assembly further includes a light source that is electrically connected to the sensing device and located beside the touching area. The light source is adapted to emit at least one third light to the touching area. The first lights are generated from the at least one third light via the optical controlling elements of the touching object.

In one embodiment of the invention, the optical controlling elements are a plurality of optical elements that have different reflectivity.

In one embodiment of the invention, the optical controlling elements are a plurality of optical elements that have different reflection wavelengths.

In one embodiment of the invention, the characteristics of the first lights generated by the optical controlling elements ascend or descend in sequence around the center axis.

In one embodiment of the invention, the optical controlling elements include a plurality of sub-controlling elements, and characteristics of the first lights generated by the sub-controlling elements of the same optical controlling element ascend or descend in sequence around the center axis.

Based on the above, due to the optical controlling elements disposed on the touching object, characteristics of the light generated by the optical controlling elements are varied along with the variation of the motion of the touching object, such that the sensing device senses the motion of the touching object to drive the display device and trigger at least one operating function accordingly.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
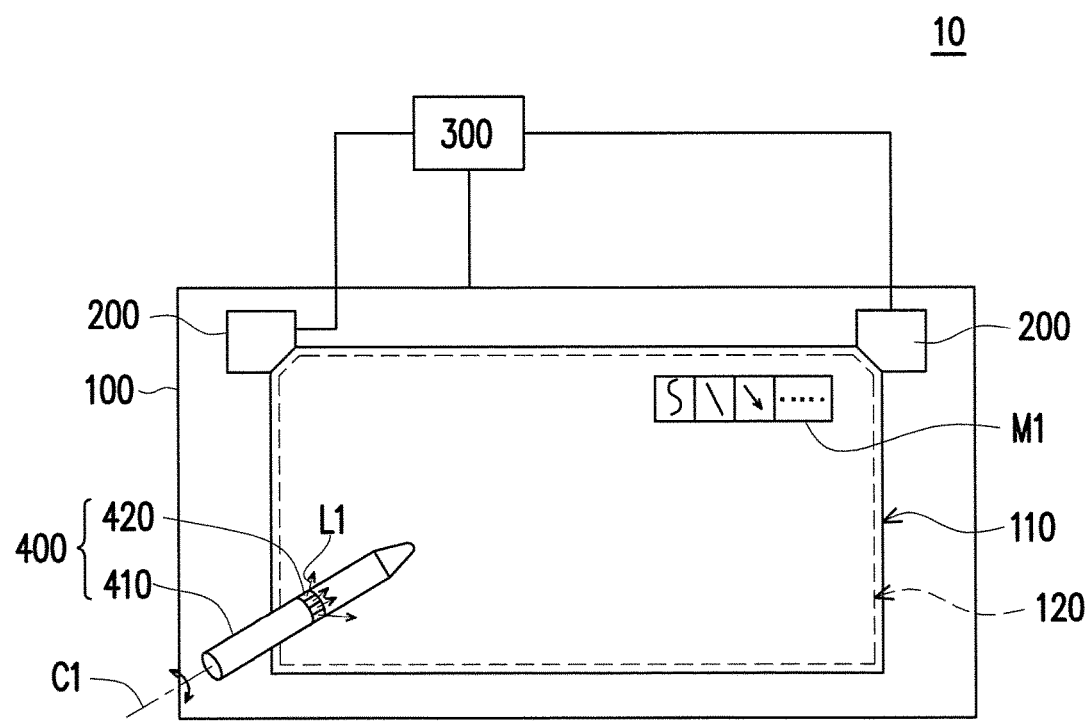
FIG. 1 is a schematic view of an optical touching assembly according to an embodiment of the invention.
Figure 2:
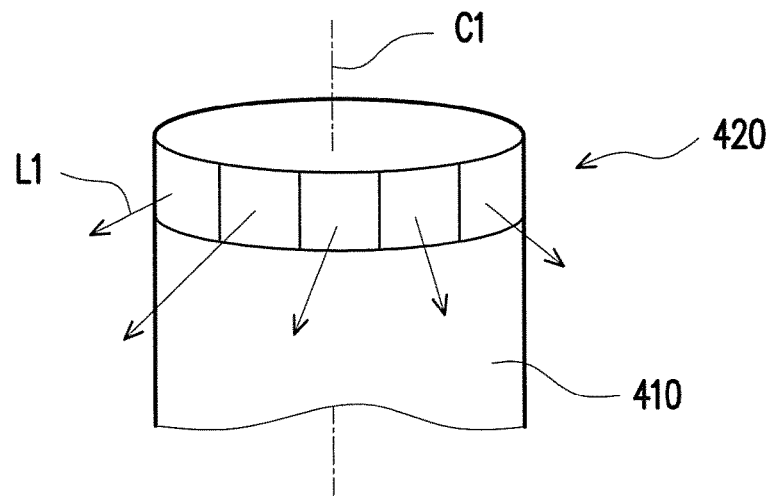
FIG. 2 is a partial schematic view of a touching object of FIG. 1.

FIG. 1 is a schematic view of an optical touching assembly according to an embodiment of the invention. FIG. 2 is a partial schematic view of a touching object of FIG. 1. With reference to FIG. 1 and FIG. 2, in this embodiment, an optical touching assembly 10 includes a display device 100, a sensing device 200, a controlling circuit 300, and a touching object 400. The display device 100 is a touching screen, for example, which has a display surface 110 and a touching area 120 in front of the display surface 110. The sensing device 200 is an optical sensor, such as CCD, CMOS, or photo diode, etc., which is disposed in the display device 100 to sense a variation of light of the touching area 120. The controlling circuit 300 is electrically connected to the sensing device 200 and the display device 100, so that the sensing device 200 senses the motion of the touching object 400 to trigger at least one operating function of the display device 100 when the touching object 400 enters the touching area 120.

To be more specific, the touching object 400 includes a main body 410 and an optical controlling element 420 disposed on the main body 410. In this embodiment, the touching object 400 has a pen shape, for example. When the user holds and moves the touching object 400 into the touching area 120, the sensing device 200 provides a corresponding sensing signal to the controlling circuit 300, based on a characteristic of the light generated by the optical controlling element 420 of the touching object 400, and accordingly, the controlling circuit 300 receives the sensing signal to determine and trigger a specific function of the display device 100.

The disclosure here is not intended to limit the types, numbers, and configurations of the display device 100, sensing device 200, and touching object 400 of the invention. In another embodiment not illustrated here, the display device may be an electronic device, such as electronic whiteboard, that utilizes a conventional optical method to perform touching operations. Moreover, the number of the sensing devices or the positions of the sensing devices may be varied to meet the actual requirements. The sensing device may be a built-in device embedded in the display device or a plug-in device assembled to the display device.

Figure 3:
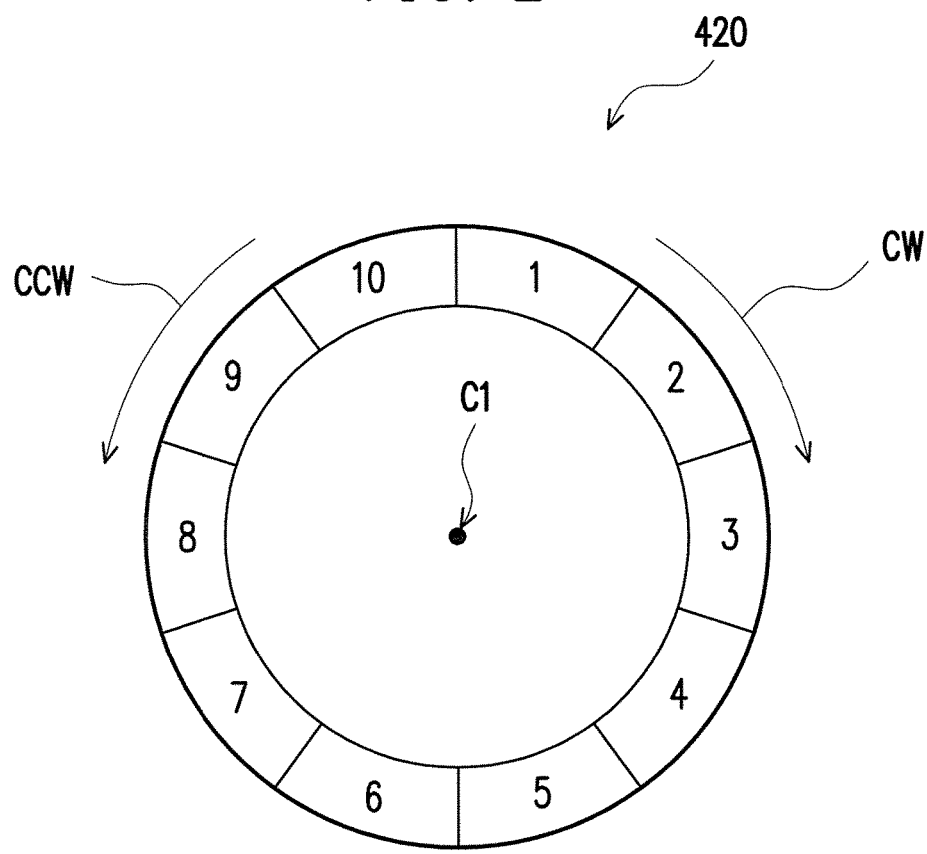
FIG. 3 is a schematic top view of an optical controlling element of FIG. 2.
Figure 4:
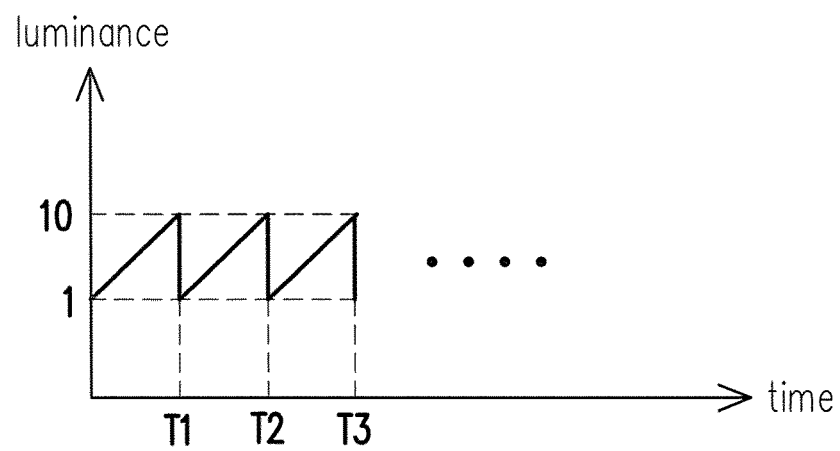
FIG. 4 and FIG. 5 respectively illustrate statuses of light of the touching object sensed by a sensing device.
Figure 5:
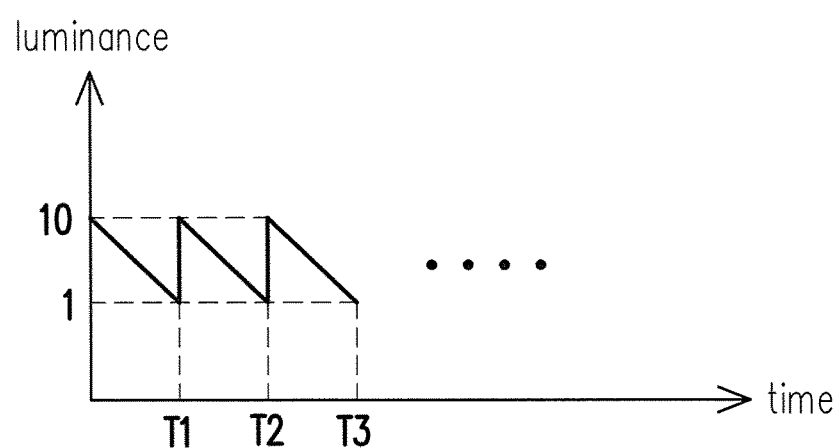

Based on the above, because the optical controlling element 420 is disposed on the main body 410 of the touching object 400, when the touching object 400 enters the touching area 120, lights with different characteristics are generated. FIG. 3 is a schematic top view of an optical controlling element of FIG. 2. FIG. 4 and FIG. 5 respectively illustrate statuses of light of the touching object sensed by the sensing device. With reference to FIG. 2 to FIG. 5, according to this embodiment, the main body 410 has a center axis C1 and a plurality of optical controlling elements 420 disposed on the main body 410. The optical controlling elements 420 are composed of a plurality of light sources (e.g. light emitting diodes or laser diodes) having different luminances and are arranged around the center axis C1. Accordingly, the optical controlling elements 420 are able to generate a plurality of first lights L1 that have different luminances for the sensing device 200 to detect and determine the motion of the touching object 400.

For example, as shown in FIG. 3, the optical controlling elements 420 are arranged around the center axis C1 in an ascending or descending order according to luminance distributions thereof. The numbers are used to indicate the luminances, and larger numbers represent higher luminances. Therefore, in a sensing time T1, when the touching object 400 revolves in a full circle relative to the center axis C1 in a direction CW, the sensing device 200 senses a luminance-time distribution in the sensing time T1, as shown in FIG. 4, namely, a graph of the luminance that increases from the number "1" to the number "10." In other words, when the sensing device 200 senses that the luminance distribution of the first light L1 in the sensing time T1 matches the graph shown in FIG. 4, the sensing device 200 determines that the touching object 400 revolves relative to the center axis C1 in the direction CW.

Furthermore, in order to increase the accuracy of the determination performed by the sensing device 200, the user can repeat the revolution and cause the optical controlling elements 420 of the touching object 400 to generate a graph distribution of sensing times T1 to T3, as shown in FIG. 4, which indicates that the touching object 400 revolves in three full circles in the direction CW. Thus, the accuracy of the determination is improved by repetition of the graph. On the other hand, when the sensing device 200 senses that the luminance distribution of the first light L1 is a descending graph as shown in FIG. 5, the sensing device 200 determines that the touching object 400 revolves about the center axis C1 in a direction CCW. The disclosure here is not intended to limit the type of the motion of the touching object 400. Any motion that can cause a progressive variation of optical characteristics for the sensing device 200 to perform determination can be utilized in this embodiment.

Accordingly, the optical touching assembly 10 of this embodiment utilizes light characteristics to determine the motion of the touching object 400 for the controlling circuit 300 to trigger at least one operating function of the display device 100. For example, with reference to FIG. 1 again, when the user intends to draw a graph with the touching object 400, an operation interface allows the user to select the types of lines via a menu M1. The conventional technology requires the user to use the touching object 400 to touch a position of the menu M1 in the touching area 120 for selection. By contrast thereto, in this embodiment, the optical controlling elements 420 are disposed so that the sensing device 200 can obtain the variation of the motion of the touching object 400. Thus, the user does not need to move the touching object 400 to the menu M1 at the upper right corner of FIG. 1. That is, the user can perform selection without moving the touching object 400 to the corresponding position of the menu M1 in the touching area 120.

Moreover, in this embodiment, before performing light sensing (i.e. before the sensing time T1), the optical touching assembly 10 senses the position of the touching object 400 in the touching area 120 via the display device 100 or the sensing device 200 and accordingly compares light characteristics that the position should correspond to, so as to maintain the accuracy of the subsequent sensing.

As mentioned above, the disclosure here is not intended to limit the type of the sensing device 200. In another embodiment not illustrated here, the sensing device may be used to sense a wavelength of the light. That is to say, the optical controlling elements in the aforementioned embodiments may be a plurality of light sources having different wavelengths and may be arranged around the center axis C1 in an ascending or descending order according to the wavelengths, which also achieves the same effects as the aforementioned embodiments.

Figure 6:
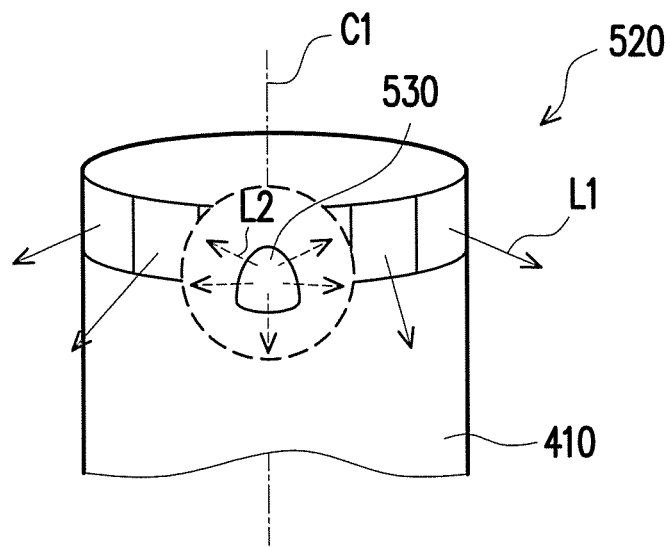
FIG. 6 is a partial schematic view of a touching object according to another embodiment of the invention.

FIG. 6 is a partial schematic view of a touching object according to another embodiment of the invention. With reference to FIG. 6, the touching object of this embodiment includes a main body 410, a plurality of optical controlling elements 520, and a light source 530 disposed in the main body 410, wherein the optical controlling elements 520 are arranged on the main body 410 around the center axis C1 in an ascending or descending order according to an optical characteristic thereof, which is similar to the aforementioned embodiments. A difference between this embodiment and the aforementioned embodiments is that the optical controlling elements 520 of this embodiment are a plurality of optical elements that have different transmittances (or different transmittance wavelengths). Accordingly, second lights L2 having the same characteristic, which are generated by the light source 530 in the main body 410, are converted into multiple first lights L1 having different optical characteristics by the optical controlling elements 520 and emitted out of the main body 410, which also achieves the same effects as the aforementioned embodiments.

Figure 7:
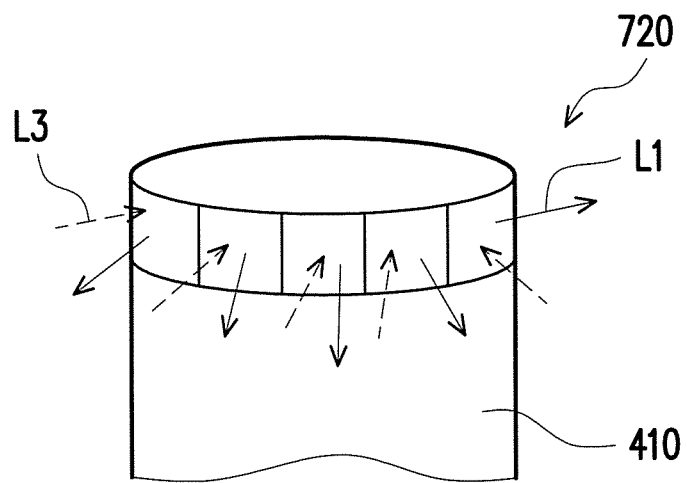
FIG. 7 is a partial schematic view of a touching object according to yet another embodiment of the invention.

FIG. 7 is a partial schematic view of a touching object according yet another embodiment of the invention. With reference to FIG. 7, different from the aforementioned embodiments, optical controlling elements 720 of the touching object are a plurality of optical elements having different reflectivity (or different reflection wavelengths). Accordingly, the optical controlling elements 720 are able to receive third lights L3 from outside and reflect the third lights L3 to generate the first lights L1 that have different optical characteristics and emit the first lights L1 out of the main body 410 to be sensed by the sensing device 200. Here, a light source (not shown in FIG. 1) may be disposed beside the touching area 120 of FIG. 1 for emitting the third lights L3 to the touching area 120 and serving as a source that provides stable and uniform third lights L3. However, it should be noted that the invention is not limited thereto.

Figure 8:
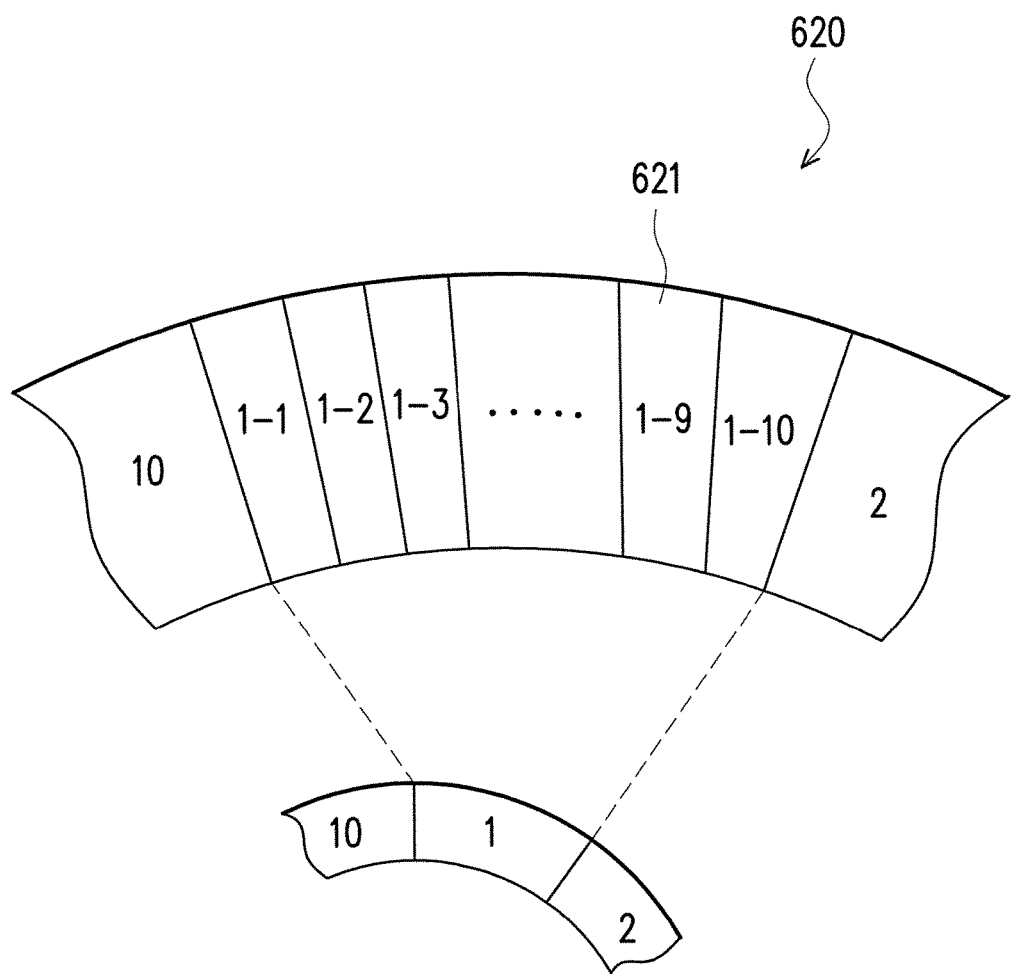
FIG. 8 is a partial schematic view of an optical controlling element according to another embodiment of the invention.

FIG. 8 is a partial schematic view of optical controlling elements according to another embodiment of the invention. With reference to FIG. 8 together with FIG. 6 as an example, in this embodiment as shown in FIG. 8, each of the optical controlling elements 620 is further divided into a plurality of sub-controlling elements 621 (as shown in FIG. 8, the optical controlling element 620 is divided into ten sub-controlling elements 621 and respectively marked as 1-1, 1-2, 1-3, . . . 1-9, and 1-10), and likewise, the sub-controlling elements 621 are arranged around the center axis C1 in an ascending or descending order according to an optical characteristic thereof (e.g. luminance or wavelength). In other words, according to this embodiment, the user is not required to revolve a touching object 600 in a full circle and can generate the effect of the graph shown in FIG. 4 or FIG. 5 by revolving 1/10 of the original revolution path (in comparison with the aforementioned embodiments wherein the optical controlling elements 420 arranged around the center axis C1 are divided into ten parts). Thus, complexity of the user's operation is effectively reduced.

To conclude the above, in the aforementioned embodiments of the invention, due to the optical controlling elements disposed on the touching object, characteristics of the light generated by the optical controlling elements are varied along with the variation of the motion of the touching object, such that the sensing device senses the motion of the touching object to drive the display device and trigger at least one operating function accordingly.

Furthermore, the optical controlling elements can be active light sources (that directly generate lights with different characteristics) or passive light sources (that convert other lights into lights with different characteristics), and the optical controlling elements are arranged around the center axis in a progressive order (ascending or descending) according to the optical characteristic thereof. Therefore, a periodical graph is generated by the revolution of the touching object around the center axis for the sensing device to perform sensing, thereby triggering the operating functions of the display device and relieving the user of operations, such as moving back and forth in the touching area, which are inconvenient for touch control.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. An optical touching assembly, comprising:
a display device comprising a touching area;
a sensing device electrically connected to the display device; and
a touching object adapted to enter the touching area, and the sensing device sensing a motion of the touching object to control the display device, wherein the touching object comprises an optical controlling element that generates a plurality of first lights along with a variation of the motion of the touching object, and the sensing device senses a characteristic variation of the first lights to trigger an operating function of the display device, wherein the optical controlling element comprises a plurality of optical controlling elements that are arranged around a center axis of the touching object, and the characteristic variation of the first lights generated by the optical controlling elements ascends or descends gradually in sequence around the center axis based on the motion of the touching object in a clock wise or a counter clock wise direction.

2. The optical touching assembly according to claim 1, wherein the touching object revolves around the center axis so that the sensing device senses different first lights generated by the optical controlling elements.

3. The optical touching assembly according to claim 2, wherein the optical controlling elements comprise a plurality of light sources that have different luminances.

4. The optical touching assembly according to claim 2, wherein the optical controlling elements comprise a plurality of light sources that have different wavelengths.

5. The optical touching assembly according to claim 2, wherein the touching object comprises a light source that generates a plurality of second lights, and the first lights are generated from the second lights via the optical controlling elements.

6. The optical touching assembly according to claim 5, wherein the optical controlling elements are a plurality of optical elements that have different transmittances.

7. The optical touching assembly according to claim 5, wherein the optical controlling elements are a plurality of optical elements that have different transmittance wavelengths.

8. The optical touching assembly according to claim 2, further comprising a light source electrically connected to the sensing device and located beside the touching area, wherein the light source is adapted to emit at least one third light to the touching area, and the first lights are generated from the at least one third light via the optical controlling elements of the touching object.

9. The optical touching assembly according to claim 8, wherein the optical controlling elements are a plurality of optical elements that have different reflectivity.

10. The optical touching assembly according to claim 8, wherein the optical controlling elements are a plurality of optical elements that have different reflection wavelengths.

11. The optical touching assembly according to claim 2, wherein each of the optical controlling elements comprises a plurality of sub-controlling elements, and characteristics of the first lights generated by the sub-controlling elements of the same optical controlling element ascend or descend in sequence around the center axis.

12. A touching object, comprising:
a main body having a center axis;
a plurality of optical controlling elements disposed on the main body and arranged around the center axis, wherein an optical characteristic of the optical controlling elements varies along with the optical controlling elements arranged around the center axis, and the optical characteristic of the optical controlling elements ascends or descends gradually in sequence around the center axis based on a motion of the touching object in a clock wise or a counter clock wise direction; and
a light source disposed in the main body, wherein the optical controlling elements convert a light of the light source into a plurality of lights having different characteristics to be emitted out of the main body, simultaneously.

13. The touching object according to claim 12, wherein the optical controlling elements are a plurality of light sources that have different wavelengths.

14. The touching object according to claim 12, wherein the optical controlling elements are a plurality of light sources that have different luminances.

15. The touching object according to claim 12, wherein the optical controlling elements are a plurality of optical elements that have different transmittances.

16. The touching object according to claim 12, wherein the optical controlling elements are a plurality of optical elements that have different transmittance wavelengths.

17. The touching object according to claim 12, wherein the optical controlling elements are a plurality of optical elements that have different reflectivity.

18. The touching object according to claim 12, wherein the optical controlling elements are a plurality of optical elements that have different reflection wavelengths.

19. The touching object according to claim 12, wherein each of the optical controlling elements comprises a plurality of sub-controlling elements, and an optical characteristic of the sub-controlling elements of the same optical controlling element ascends or descends in sequence around the center axis.

* * * * *